United States Patent
Eitan et al.

(10) Patent No.: US 10,972,324 B2
(45) Date of Patent: Apr. 6, 2021

(54) DUAL RECEIVER FOR MILLIMETER WAVE COMMUNICATIONS

(71) Applicant: QUALCOMM Incorporated, San Diego, CA (US)

(72) Inventors: Alecsander Petru Eitan, Haifa (IL); Amichai Sanderovich, Atlit (IL)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 15/416,113

(22) Filed: Jan. 26, 2017

(65) Prior Publication Data

US 2017/0222852 A1   Aug. 3, 2017

Related U.S. Application Data

(60) Provisional application No. 62/288,298, filed on Jan. 28, 2016.

(51) Int. Cl.
*H04L 27/26*     (2006.01)
*H04B 7/08*      (2006.01)
(Continued)

(52) U.S. Cl.
CPC ....... *H04L 27/2602* (2013.01); *H04B 7/0686* (2013.01); *H04B 7/0868* (2013.01); *H04W 28/26* (2013.01)

(58) Field of Classification Search
CPC ... H04W 16/28; H04W 28/18; H04W 64/006; H04W 74/004; H04W 74/006; H04W 74/0808; H04W 76/28
(Continued)

(56) References Cited

U.S. PATENT DOCUMENTS 8,891,592 B1    11/2014  Zhang et al.
2010/0014457 A1  1/2010  Nandagopalan
(Continued)

FOREIGN PATENT DOCUMENTS

WO    WO-2007146685 A1    12/2007

OTHER PUBLICATIONS

International Search Report and Written Opinion—PCT/US2017/015215—ISA/EPO—Apr. 18, 2017.

*Primary Examiner* — Natasha W Cosme
(74) *Attorney, Agent, or Firm* — Patterson+ Sheridan, L.L.P.

(57) ABSTRACT

Certain aspects relate to methods and apparatus for wireless communication. Particularly, aspects relate to techniques for wireless communications by an apparatus including a receive processing chain configured to process frames of a first type obtained via an omnidirectional antenna and frames of a second type obtained via an antenna array, a detector configured to detect a preamble portion of a frame of the first type, and a processing system configured to switch an input path of the receive processing chain from the antenna array to the omnidirectional antenna after the detection. Other aspects relate to wireless communications by an apparatus including a processing system that generates a frame of a first type having an indication that the apparatus can switch between outputting omnidirectional frames and outputting beamforming frames for transmission independent of channel reservation signaling, and a first interface configured to output the frame of the first type for transmission.

10 Claims, 8 Drawing Sheets

(51) Int. Cl.
*H04B 7/06* (2006.01)
*H04W 28/26* (2009.01)

(58) Field of Classification Search
USPC .......................................................... 370/329
See application file for complete search history.

(56) References Cited

U.S. PATENT DOCUMENTS

| | | | |
|---|---|---|---|
| 2010/0277368 A1 | 11/2010 | Ponnuswamy | |
| 2011/0305162 A1* | 12/2011 | Morioka | H04W 16/28 370/252 |
| 2012/0064841 A1* | 3/2012 | Husted | H01Q 21/205 455/78 |
| 2015/0139116 A1* | 5/2015 | Wang | H04B 7/0408 370/329 |
| 2019/0150030 A1* | 5/2019 | Sun | H04W 28/06 |

\* cited by examiner

DUAL RECEIVER FOR MILLIMETER WAVE COMMUNICATIONS

CLAIM OF PRIORITY UNDER 35 U.S.C. § 119

The present Application for Patent claims benefit of U.S. Provisional Patent Application Ser. No. 62/288,298, filed Jan. 28, 2016, assigned to the assignee hereof and hereby expressly incorporated by reference herein.

TECHNICAL FIELD

Aspects of the present disclosure relate generally to wireless communications systems and, more particularly, to techniques for operating a dual receiver for millimeter wave communications.

BACKGROUND

The 60 GHz band is an unlicensed band which features a large amount of bandwidth and a large worldwide overlap. The large bandwidth means that a very high volume of information can be transmitted wirelessly. As a result, multiple applications, each requiring transmission of large amounts of data, can be developed to allow wireless communication around the 60 GHz band. Examples for such applications include, but are not limited to, game controllers, mobile interactive devices, wireless high definition TV (HDTV), wireless docking stations, wireless Gigabit Ethernet, and many others.

In order to facilitate such applications there is a need to develop integrated circuits (ICs) such as amplifiers, mixers, radio frequency (RF) analog circuits, and active antennas that operate in the 60 GHz frequency range. An RF system typically comprises active and passive modules. The active modules (e.g., a power amplifier or other amplifiers) require control and power signals for their operation, which are not required by passive modules (e.g., filters). The various modules are fabricated and packaged as radio frequency integrated circuits (RFICs) that can be assembled on a printed circuit board (PCB). The size of the RFIC package may range from several to a few hundred square millimeters.

In the consumer electronics market, the design of electronic devices, and thus the design of RF modules integrated therein, should meet the constraints of minimum cost, size, power consumption, and weight. The design of the RF modules should also take into consideration the current assembled configuration of electronic devices, and particularly handheld devices, such as laptop and tablet computers, in order to enable efficient transmission and reception of millimeter wave signals. Furthermore, the design of the RF module should account for minimal power loss of receive and transmit RF signals and for maximum radio coverage.

Operations in the 60 GHz band allow the use of smaller antennas as compared to lower frequencies. However, as compared to operating in lower frequencies, radio waves around the 60 GHz band have high atmospheric attenuation and are subject to higher levels of absorption by atmospheric gases, rain, objects, etc., resulting in higher free space loss. In part due to higher free space loss, link budgets in millimeter wave signals are relatively tight. To compensate, directional antennas and beam forming may be used. Additionally, an Omni antenna may be supported as a receiver, for example, may not know from which direction a transmission may come from prior to establishing a directional connection. One of the challenges of operating with millimeter wave frequencies is managing receiver antennas effectively.

SUMMARY

Certain aspects of the present disclosure relate to methods and apparatus for wireless communication. More particularly, aspects of the present disclosure generally relate to techniques for wireless communications by an apparatus comprising a receive processing chain configured to process frames of a first type obtained via an omnidirectional antenna and frames of a second type obtained via an antenna array, at least one detector configured to detect a preamble portion of a frame of the first type, and a processing system configured to switch an input path of the receive processing chain from the antenna array to the omnidirectional antenna after the detection.

Certain aspects of the present disclosure relate to methods and apparatus for wireless communication. More particularly, aspects of the present disclosure generally relate to techniques for wireless communications by an apparatus comprising a processing system configured to generate a frame of a first type having an indication that the apparatus is configured to switch between outputting omnidirectional frames and outputting beamforming frames for transmission independent of channel reservation signaling, and a first interface configured to output the frame of the second type for transmission.

Certain aspects of the present disclosure also provide various other apparatuses, methods, and computer readable media capable of performing (or causing an apparatus to perform) the operations described herein.

DETAILED DESCRIPTION

Figure 1:
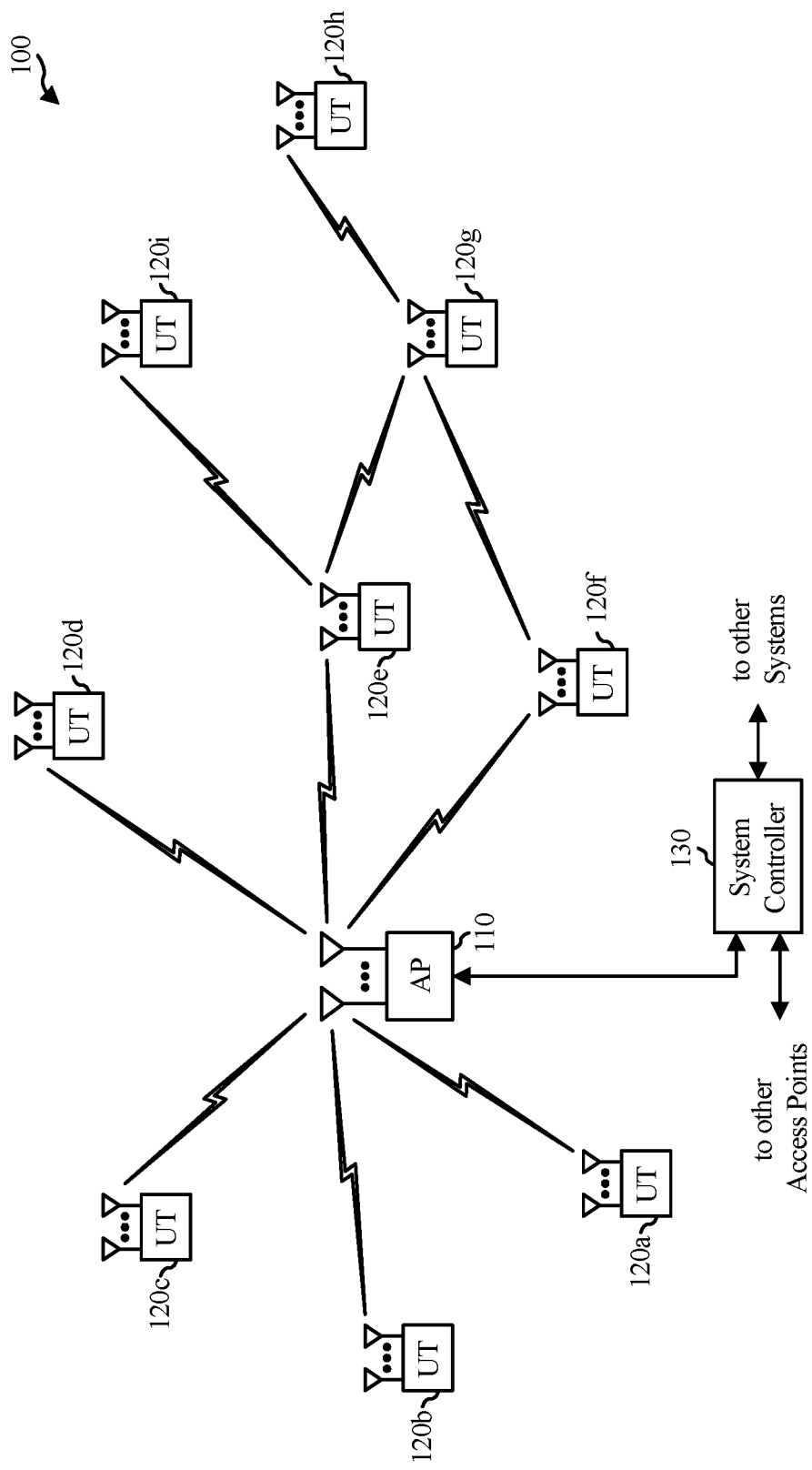
FIG. 1 illustrates a diagram of an example wireless communications network, in accordance with certain aspects of the present disclosure.

Certain aspects of the present disclosure provide techniques for a dual receiver for millimeter wave communications. Communications in a millimeter wave band generally have relatively tight link budgets that may be compensated for through beamforming and directional connections. These directional connections may be established via Omni-directional signaling as a receiver may not be aware of which direction the transmitter is, and vice versa. Generally a receiver may not operate in both Omni mode and beamformed, directional mode simultaneously due to link budget limitations and may require techniques for switching between an omnidirectional receive mode and a directional receive mode based on a detected preamble portion of a frame.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple stations (STAs). A TDMA system may allow multiple STAs to share the same frequency channel by dividing the transmission signal into different time slots, each time slot being assigned to different STA. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an STA.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points (APs) 110 and STAs 120 in which aspects of the present disclosure may be practiced. The MIMO system 100 may be a multiuser MIMO system (MU-MIMO). Although not illustrated in FIG. 1, another example wireless communication can be a single-input single-output (SISO) in which aspects of the present disclosure can be practiced.

For simplicity, only one access point 110 is shown in FIG. 1. An access point is generally a fixed station that communicates with the STAs and may also be referred to as a base station or some other terminology. A STA 120 may be fixed or mobile and may also be referred to as a mobile station, a wireless device, or some other terminology. Access point 110 may communicate with one or more STAs 120 at any given moment on the downlink and uplink. The downlink (i.e., forward link) is the communication link from the access point to the STAs, and the uplink (i.e., reverse link) is the communication link from the STAs to the access point. A STA 120 may also communicate peer-to-peer with another STA. A system controller 130 couples to and provides coordination and control for the access points.

While portions of the following disclosure will describe STAs 120 capable of communicating via Spatial Division Multiple Access (SDMA), for certain aspects, the STAs 120 may also include some STAs that do not support SDMA. Thus, for such aspects, an access point (AP) 110 may be configured to communicate with both SDMA and non-SDMA STAs. This approach may conveniently allow multiple versions of STAs ("legacy" stations) to remain deployed in an enterprise, extending their useful lifetime, while allowing newer SDMA STAs to be introduced as deemed appropriate.

In the example MIMO system 100, the access point 110 and STAs 120 can employ multiple transmit and multiple receive antennas for data transmission on the downlink and uplink. In a SISO system, the AP 110 and STAs 120 can employ only a single antenna for transmission and reception. Although not shown, other example wireless communications systems in which the aspects of the present disclosure can be deployed include a SISO system, MU-MIMO system, single carrier MIMO system, or single carrier MU-MIMO system. For downlink MIMO transmissions, $N_{ap}$ antennas of the access point 110 represent the multiple-input (MI) portion of MIMO, while a set of K STAs represent the multiple-output (MO) portion of MIMO. Conversely, for uplink MIMO transmissions, the set of K STAs represent the MI portion, while the $N_{ap}$ antennas of the access point 110 represent the MO portion. For pure SDMA, it is desired to have $N_{ap} \geq K \geq 1$ if the data symbol streams for the K STAs are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected STA 120 transmits user-specific data to and/or receives user-specific data from the access point. In general, each selected STA 120 may be equipped with one or multiple antennas (i.e., $N_{ut} \geq 1$). The K selected STAs 120 can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each STA 120 may be equipped with a single antenna (e.g., in order to keep costs down) or multiple antennas (e.g., where the additional cost can be supported). The MIMO system 100 may also be a TDMA system if the STAs 120 share the same frequency channel by dividing transmission/reception into different time slots, each time slot being assigned to different STAs 120.

Figure 2:
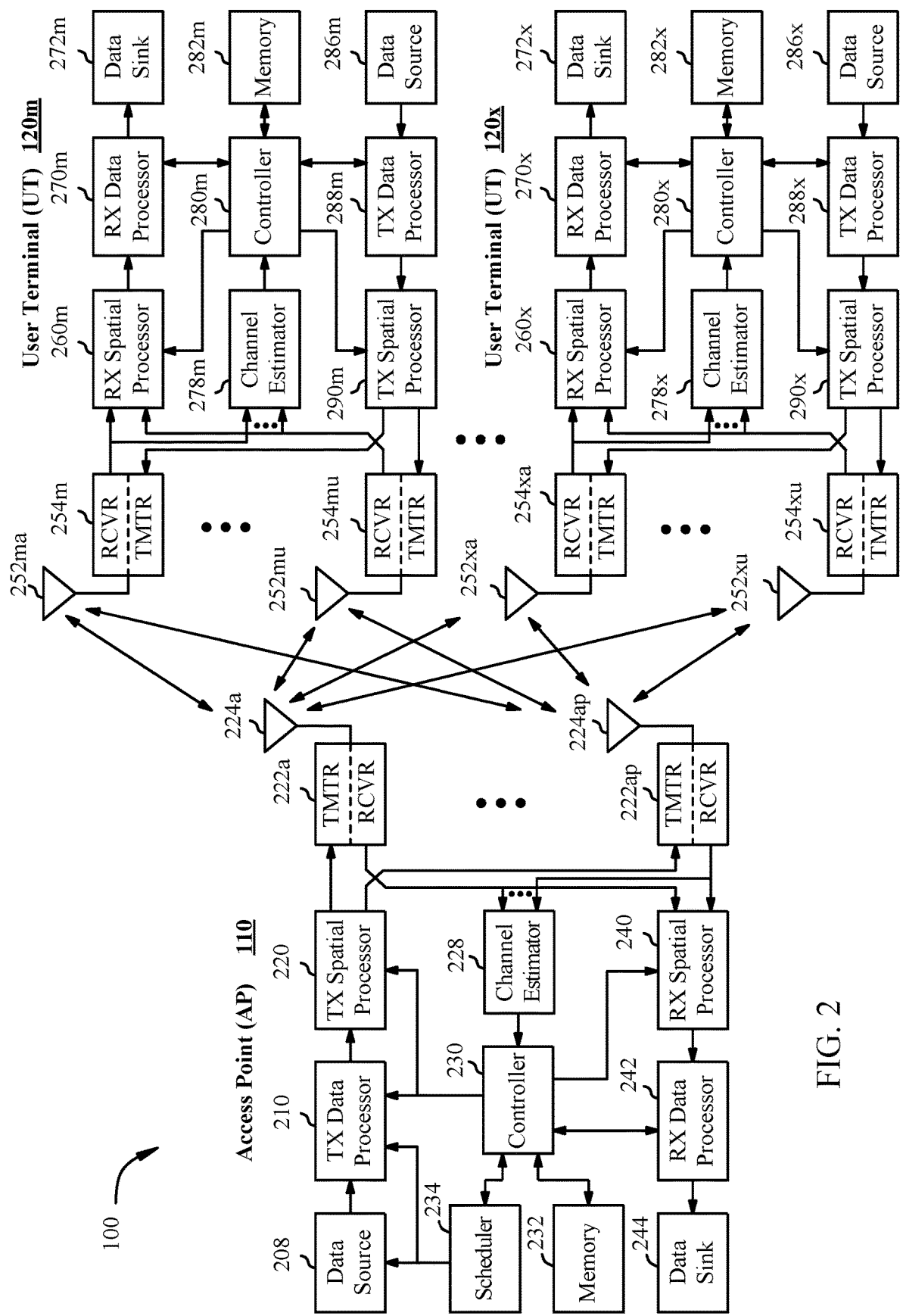
FIG. 2 illustrates a block diagram of an example access point and stations (STAs), in accordance with certain aspects of the present disclosure.

FIG. 2 illustrates a block diagram of access point 110 and two STAs 120m and 120x in MIMO system 100 in which aspects of the present disclosure may be practiced. As discussed above, the rotation determination techniques discussed herein may be practiced by an access point 110 or STA 120.

The access point 110 is equipped with $N_t$ antennas 224a through 224t. STA 120m is equipped with $N_{ut,m}$ antennas 252ma through 252mu, and STA 120x is equipped with $N_{ut,x}$ antennas 252xa through 252xu. The access point 110 is a transmitting entity for the downlink and a receiving entity for the uplink. Each STA 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up"

denotes the uplink, Nup STAs are selected for simultaneous transmission on the uplink, Ndn STAs are selected for simultaneous transmission on the downlink, Nup may or may not be equal to Ndn, and Nup and Ndn may be static values or can change for each scheduling interval. The beam-steering or some other spatial processing technique may be used at the access point and STA.

On the uplink, at each STA 120 selected for uplink transmission, a transmit (TX) data processor 288 receives traffic data from a data source 286 and control data from a controller 280. TX data processor 288 processes (e.g., encodes, interleaves, and modulates) the traffic data for the STA 120 based on the coding and modulation schemes associated with the rate selected for the STA 120 and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup STAs may be scheduled for simultaneous transmission on the uplink. Each of these STAs performs spatial processing on its data symbol stream and transmits its set of transmit symbol streams on the uplink to the access point.

At access point 110, $N_{ap}$ antennas 224a through 224ap receive the uplink signals from all Nup STAs transmitting on the uplink. Each antenna 224 provides a received signal to a respective receiver unit (RCVR) of transceiver 222. Each receiver unit of transceiver 222 performs processing complementary to that performed by transmitter unit 254 and provides a received symbol stream. An RX spatial processor 240 performs receiver spatial processing on the $N_{ap}$ received symbol streams from $N_{ap}$ receiver units of transceivers 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective STA. An RX data processor 242 processes (e.g., demodulates, deinterleaves, and decodes) each recovered uplink data symbol stream in accordance with the rate used for that stream to obtain decoded data. The decoded data for each STA 120 may be provided to a data sink 244 for storage and/or a controller 230 for further processing.

On the downlink, at access point 110, a TX data processor 210 receives traffic data from a data source 208 for Ndn STAs scheduled for downlink transmission, control data from a controller 230, and possibly other data from a scheduler 234. The various types of data may be sent on different transport channels. TX data processor 210 processes (e.g., encodes, interleaves, and modulates) the traffic data for each STA 120 based on the rate selected for that STA. TX data processor 210 provides Ndn downlink data symbol streams for the Ndn STAs. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit of transceiver 222 receives and processes a respective transmit symbol stream to generate a downlink signal. $N_{ap}$ transmitter units of transceivers 222 providing $N_{ap}$ downlink signals for transmission from $N_{ap}$ antennas 224 to the STAs.

At each STA 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the STA. The receiver spatial processing is performed in accordance with the CCMI, MMSE or some other technique. An RX data processor 270 processes (e.g., demodulates, deinterleaves and decodes) the recovered downlink data symbol stream to obtain decoded data for the STA.

At each STA 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each STA 120 typically derives the spatial filter matrix for the STA 120 based on the downlink channel response matrix Hdn,m for that STA. Controller 230 derives the spatial filter matrix for the access point 110 based on the effective uplink channel response matrix Hup,eff. Controller 280 for each STA 120 may send feedback information (e.g., the downlink and/or uplink eigenvectors, eigenvalues, SNR estimates, and so on) to the access point 110. Controllers 230 and 280 also control the operation of various processing units at access point 110 and STA 120, respectively.

According to certain aspects of the present disclosure, the various processors shown in FIG. 2 may direct the operation at an AP 110 and/or STA 120, respectively, to perform various techniques described herein, to determine relative rotation based on training signals and/or other processes for the techniques described herein.

Figure 3:
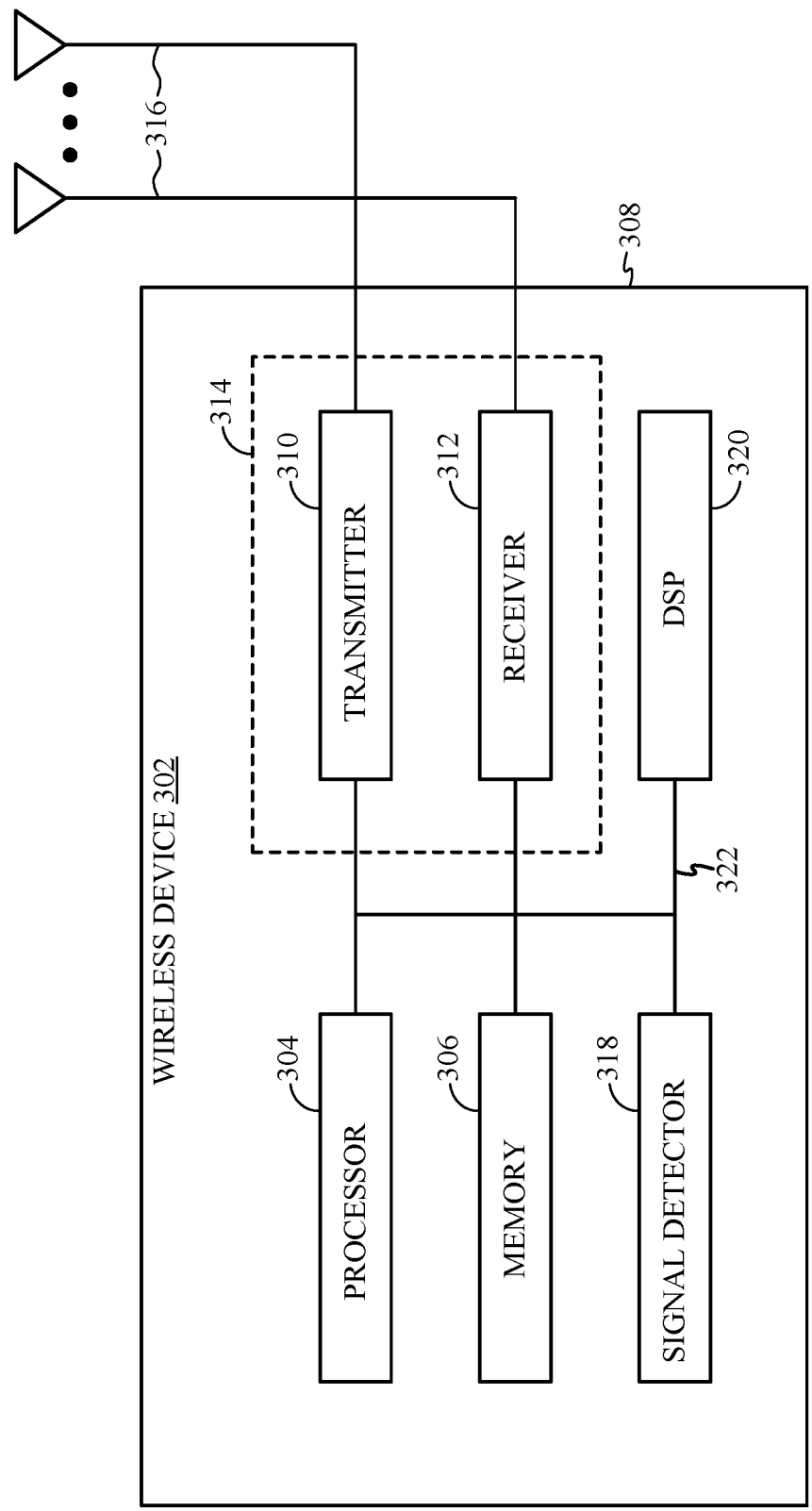
FIG. 3 illustrates a block diagram of an example wireless device, in accordance with certain aspects of the present disclosure.

FIG. 3 illustrates various components that may be utilized in a wireless device 302 in which aspects of the present disclosure may be practiced and that may be employed within the MIMO system 100. The wireless device 302 is an example of a device that may be configured to implement the various methods described herein. The wireless device 302 may be an access point 110 or a STA 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein. Processor 304 may, for example, perform or direct operations 500 and/or 600 in FIGS. 5 and 6 to process and/or generate frames and/or other processes for the techniques described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers. The transceiver 314 can use a single antenna (not shown) for both transmitting and receiving or can use different antennas 316 for transmitting and receiving. The antennas 316 may be separate or shared by the transmitter 310 and receiver 312. Sharing may be particularly suitable when transmission and reception are not simultaneous.

The wireless device 302 may use multiple transmitters, multiple receivers, and/or multiple transceivers in communicating with a WWAN and one or more WLANs. Additionally or alternatively, the wireless device 302 may communicate with a WWAN via the transceiver 314 and retune the transceiver 314 (tune away from the WWAN) to communicate with one or more WLANs.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In certain systems, such as IEEE 802.11ad, 802.11ay, and millimeter wave (mmWave) type systems, link budgets may be relatively tight. To compensate, these systems may employ beamforming. A beamforming training procedure helps address problems related to high path loss experienced for communications in the millimeter-wave spectrum by allowing for increased antenna gain. The beamforming training is typically employed by a pair of millimeter-wave stations, e.g., a receiver and transmitter. The beamforming training may comprise a bidirectional sequence of beamforming training frame transmissions that uses sector sweep and provides the necessary signals to allow each station to determine appropriate antenna system settings for both transmission and reception. After the successful completion of beamforming training, a directional millimeter-wave communication link is established. This directional link may be required for data transmissions in certain systems and result in a narrow beam with a relatively high data rate.

In addition, these systems may also use high sensitivity transmission/reception mode, which may be referred to as a "control PHY" mode, in order to reach or connect to another device whose receive antennas are not yet trained to the direction of a transmission. For example, prior to establishing a communication link, a device may not know the direction of another device and may receive a transmission from any direction.

In this control PHY mode, a transmitting device may transmit physical layer (PHY) frames at a low data rate supported by each of the devices operating in the system, for example, in order to communicate basic control information related to establishing directional communications, e.g., beamforming training.

A receiver operating in this mode typically operates in an "Omni" mode, where its antennas are configured such that they can receive signals from all directions. Prior to beamforming training, a device may not know the direction from which a signal may be received and, thus, may be configured to receive signals from all directions.

Some such receivers may use a single receive chain or multiple receive chains. In general, a receive chain (e.g., receive processing chain) refers to a set of components used to process and detect an RF signal received via one or more antennas. When using a single receive chain coupled to a single detector in an Omni mode of operation, coverage of the device may be determined by the sensitivity of the receive chain and the particular antenna configuration, as opposed to a link-budget of a trained link. Therefore, even though the control PHY mode of transmission may use a low transmission rate, e.g., 23 megabits per second (mbps), poor signal-to-noise ratio (SNR) for signals received from certain directions may result in poor coverage.

Some devices may include a plurality of Omni elements in an antenna array arranged to receive signals Omni-directionally. A single receive chain coupled to a single detector circuit may not have sufficient sensitivity for this configuration. For example, sensitivity for a single receive chain coupled to a single detector circuit may be 15 dB below the sensitivity that may be needed for a device to operate the control PHY mode.

Some devices may include multiple detector circuits in a receiving device. For example, assuming a four antenna array configuration, four different detectors may be used to detect signals received by each antenna array. By including multiple detectors in a receiving device, signal reception coverage of a device may be increased by, e.g., taking advantage of antenna gain of multiple antenna arrays. As an example, assuming the same three-array configuration discussed above, three different detectors may be used to detect signals received by each of the antenna arrays. This arrangement may decrease sensitivity required for detection (e.g., by 5 dB), and increase coverage.

Figure 4:
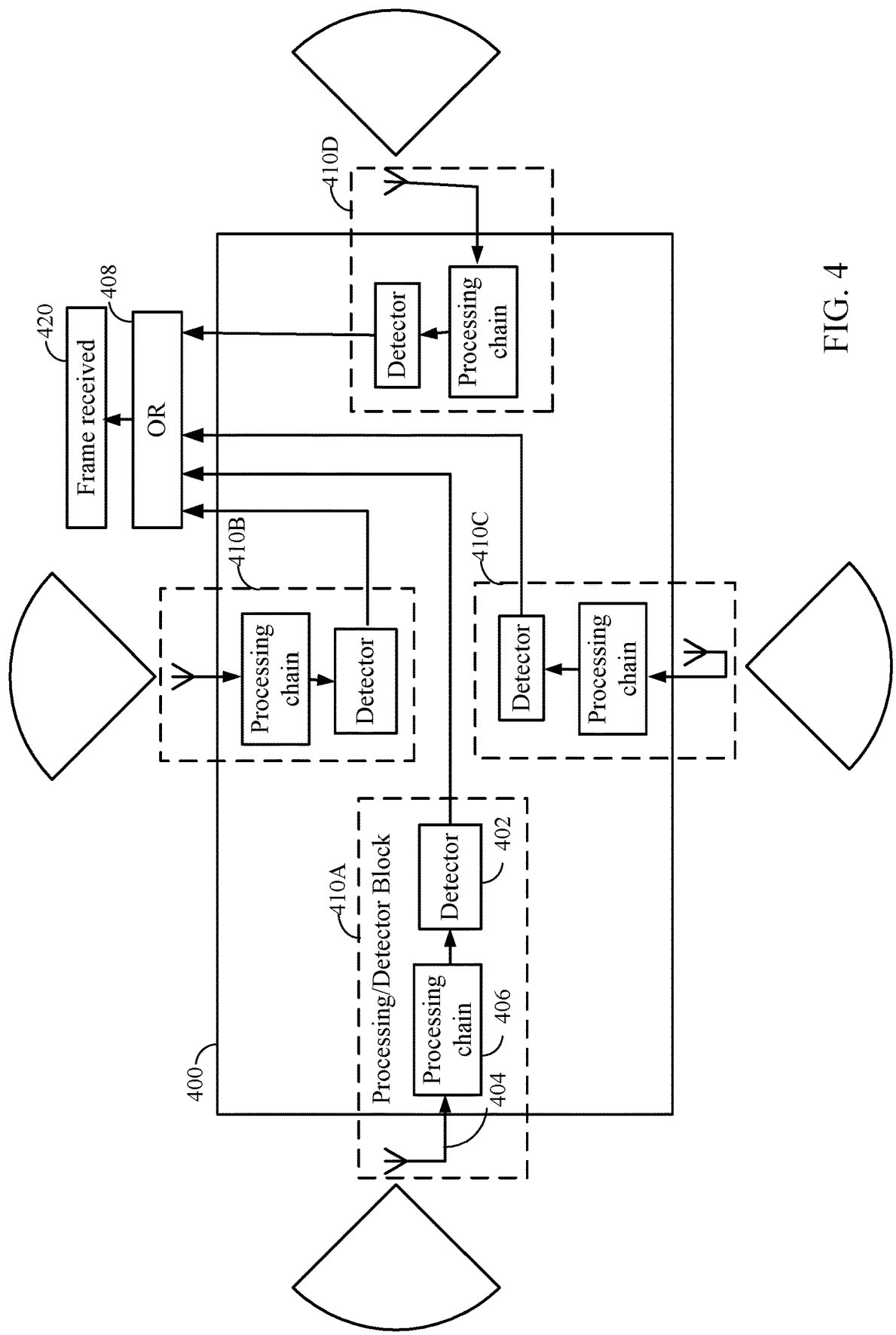
FIG. 4 is a block diagram of a device having a plurality of detectors, according to certain aspects of the present disclosure.

FIG. 4 is a block diagram of a device 400 having a plurality of processing/detector blocks 410. In the illustrated example, there are four such blocks, 410A, 410B, 410C, and 410D, each having a processing chain 406, and a detector 402, each configured to detect a signal (e.g., a control PHY preamble) received by a respective one of a plurality of antenna arrays antennas 404/Each antenna array 404 is generally configured to receive signals from one of a plurality of directions. The signals received by each of the antennas 404 are processed by respective processing chains 406. That is, a signal received by at least one of the plurality of antenna arrays 404 may be processed via a respective processing chain (e.g., one of the plurality of processing chains 406), and detected by a respective one of the plurality of detectors 402. The detectors 402 may be configured to detect a particular type of known signal transmitted by another device, such a Golay sequence, a preamble, etc., rather than a full receiver. For example, the detectors 402 may be configured to detect the control PHY preamble, or some portion of the control PHY preamble. The outputs of the detectors 402 may be combined (e.g., a logic OR operation via logic gate 408) and a processing system of the device 400 may use the combined signal to determine whether a frame receiver 420 has been received. For example, the processing system may monitor and determine when the output of the logic gate 408 indicates a logic high. Based on this determination, the processing system can determine that one of the plurality of detectors 402 has detected the frame and, thus, the frame has been received at a frame receiver 420. In some cases, multiple RF modules (e.g., in line with FIG. 7) may be connected to a single frame receiver 420.

For example, a device may include three antenna arrays, a first antenna array oriented according to a vertical polarization, a second oriented according to a horizontal polarization, and a third oriented according to the side of the receiving device. As noted above, however, the device may have a receive chain coupled to a single detector used for all of such arrays, which may make it difficult to actually detect direction of a received signal. By including multiple detectors in a receiving device, however, signal reception coverage of a device may be increased by, e.g., taking advantage of antenna gain of multiple antenna arrays. As an example, assuming the same three-array configuration discussed above, three different detectors may be used to detect signals received by each of the antenna arrays. This arrangement may decrease sensitivity required for detection (e.g., by 5 dB), and increase coverage.

Generally a receiver may not operate in both Omni mode and beamformed, directional mode simultaneously due to various limitations, such as hardware being limited to a single receiver sub-module. Such receivers may need to switch between Omni mode and a directional mode. For example, a first station which wants to send a message to a second station may transmit a request to send (RTS) via the control PHY. The second station, listening in Omni mode, receives the RTS and responds with a clear to send (CTS). At some point, beamforming training occurs and, after beamforming, data transmissions may be sent using the directional mode. Beamforming may take place either before or after the RTS/CTS exchange. For example, where a station is associated with an AP having a previously trained directional link, the AP may send an Omni RTS to the station and the station replies with a CTS and directs its antenna to the AP. As the antenna was previously trained, the AP may then begin transmitting in directional mode after reception of the CTS. The overhead for these handshake channel reservation messages (e.g., the RTS and CTS) may be approximately 34 μsec total.

Example Dual Receiver for Millimeter Wave Communications

As noted above, aspects of the present disclosure provide techniques for a dual receiver for millimeter wave communications. Generally a receiver may not operate in both Omni mode and beamformed, directional mode simultaneously due to various limitations and may require techniques for switching between an omnidirectional receive mode and a directional receive mode based on a detected preamble portion of a frame.

Figure 5:
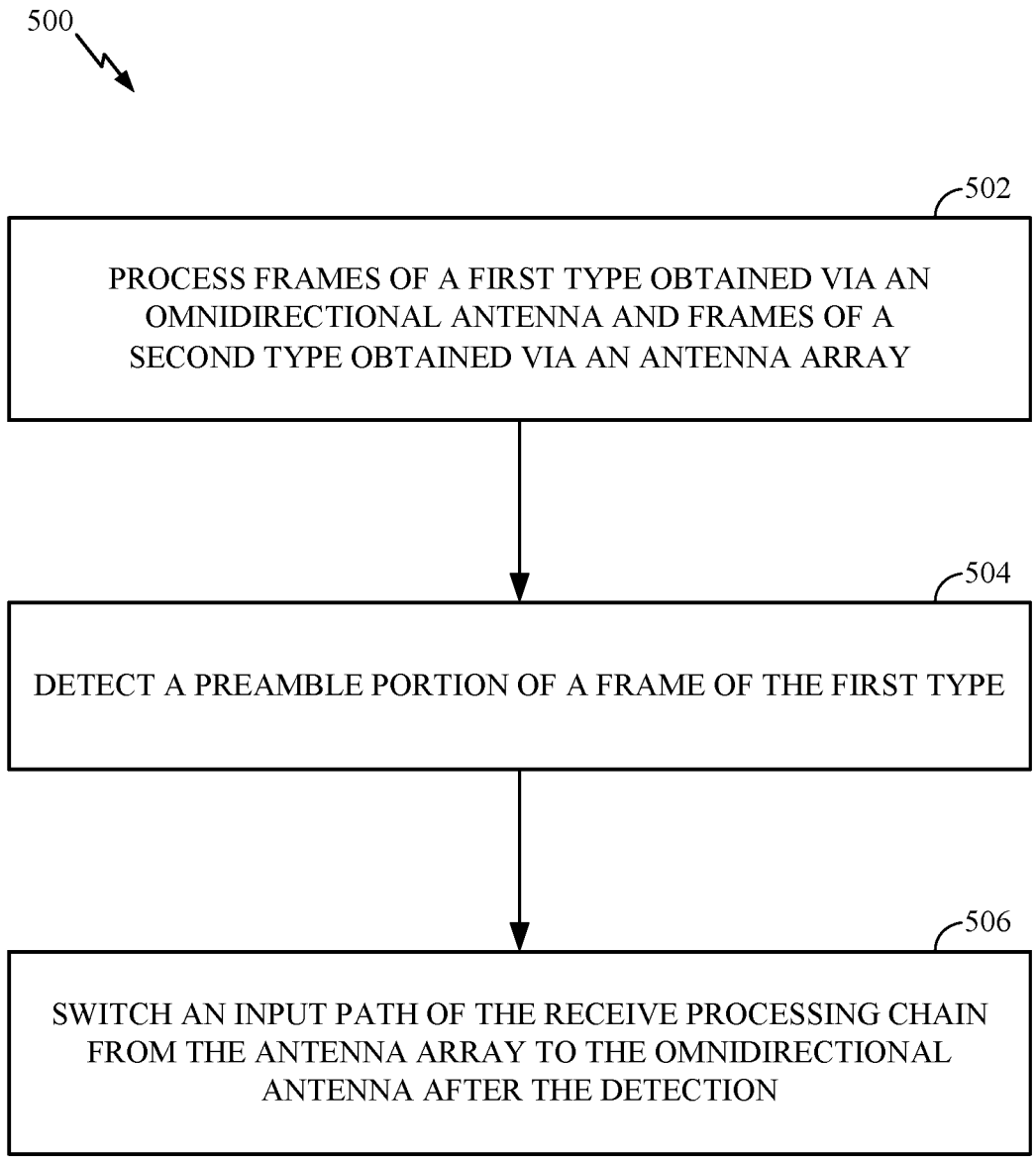
FIGS. 5 and 5A illustrate example operations for wireless communications, according to certain aspects of the present disclosure.

FIG. 5 illustrates example operations 500 for wireless communications, according to certain aspects of the present disclosure. Operations 500 begin, at 502, by processing frames of a first type obtained via an omnidirectional antenna and frames of a second type obtained via an antenna array. Operations 500 continue, at 504, by detecting a preamble portion of a frame of the first type. In some cases the frame of the first type includes a control frame having a preamble portion longer than a preamble portion of a frame of the second type. Further, Operations 500 include, at 506, switching an input path of the receive processing chain from the antenna array to the omnidirectional antenna, after the detection.

In some cases the detector may distinguish the preamble portion of the frame of the first type from a preamble portion of a frame of the second type, and generate a signal in response to detecting the preamble portion of the first type to cause the processing system to switch the input path of the receive processing chain from the antenna array to the omnidirectional antenna.

In some cases the processing system may decode the preamble portion of the frame of the first type and process at least a remaining portion of the frame of the first type, based on information in the preamble portion. Further, the processing system may signal the at least one detector to temporarily stop attempting to detect a preamble portion of frames of the first type, after obtaining a frame of the second type.

Figure 6:
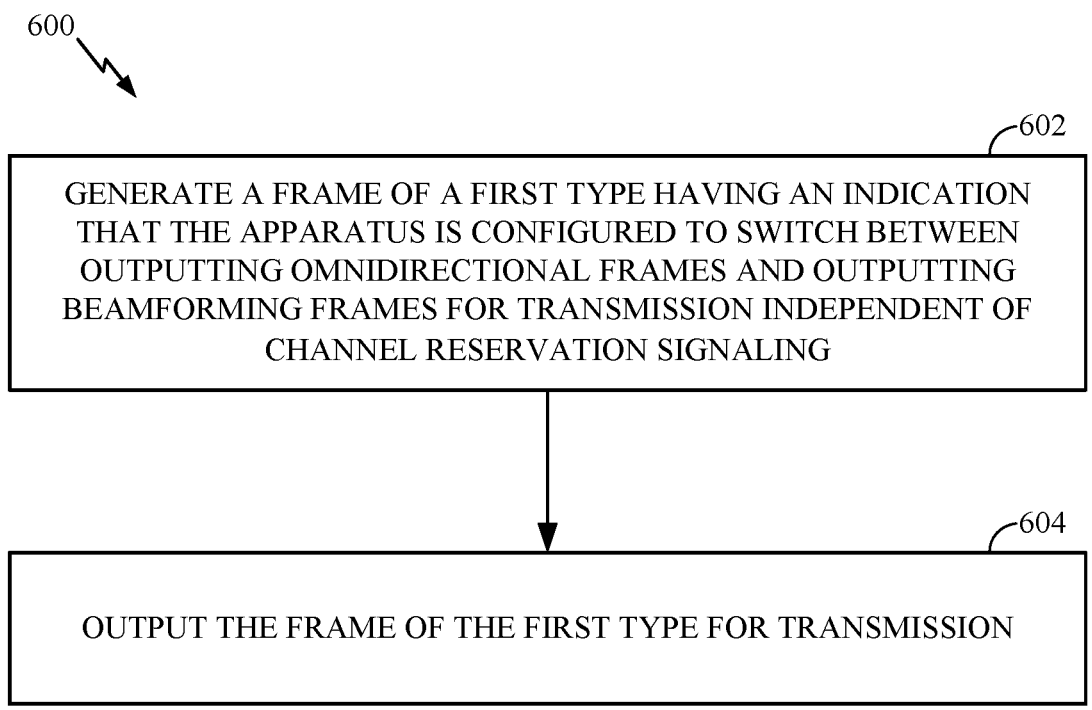
FIGS. 6 and 6A illustrate example operations for wireless communications, according to certain aspects of the present disclosure.

FIG. 6 illustrates example operations 600 for wireless communications, according to certain aspects of the present disclosure. Operations 600 begin, at 602, by generating a frame of a first type having an indication that the apparatus is configured to switch between outputting omnidirectional frames and outputting beamforming frames for transmission independent of channel reservation signaling. Operations 600 include, at 604, outputting the frame of the first type for transmission. The omnidirectional frames may include control frames and the beamforming frames may include data frames.

In some cases the processing system may switch the input path of the receive processing chain based on detection of the preamble portion by the at least one detector (e.g., only) after obtaining the indication. Further, in some cases the processing can generate a frame of a second type having an indication that the apparatus can use channel reservation signaling to switch between outputting omnidirectional frames and outputting beamforming frames for transmission, and a first interface can output the frame of the second type for transmission.

Figure 7:
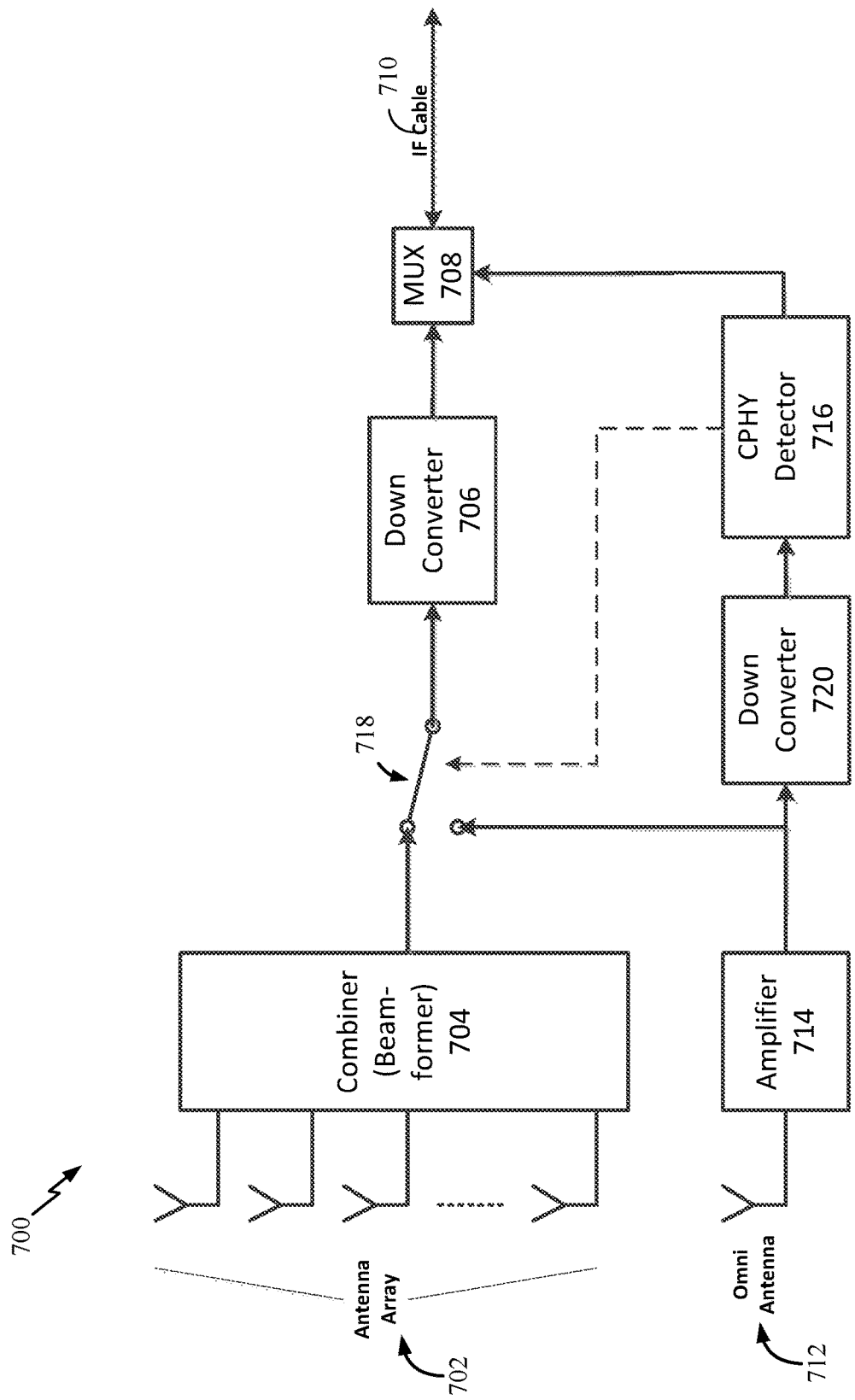
FIG. 7 illustrates an example dual receiver for millimeter wave communications, according to certain aspects of the present disclosure.

FIG. 7 illustrates an example dual receiver 700 for millimeter wave communications, according to certain aspects of the present disclosure. The dual receiver 700 includes a plurality of antenna arrays 702, which are configurable for directional reception. Signals received by the at least one of the plurality of antenna arrays 702 may be processed by the combiner 704, which may also provide amplification functionality. The combiner 704 may perform beamforming and may, along with the antenna arrays 702 be active and listening for incoming transmissions in directional mode.

According to aspects of the present disclosure, a station may configure the combiner 704 and antenna arrays 702 to be active and listening, for example, under certain conditions, always active, or as a default mode. If the dual receiver 700 receives a directional transmission from a transmitter where the antenna arrays 702 were previously trained on the transmitter, the dual receiver 700 is immediately able to receive the transmission. The received directional signal may be passed through a receive processing chain including, for example, the downconverter 706 and MUX 708 to an intermediate frequency (IF) cable 710 and on to a receiver (not shown) and acted upon accordingly without the need for a CTS/RTS exchange as the antenna arrays 702 and combiner 704 are already listening for transmissions to the station. The downconverter 706, for example, generates an intermediate frequency (IF) signal from the radio frequency (RF) signal obtained via either the antenna array or the omnidirectional antenna. Similarly, downconverter 720 may generate an IF signal from the RF signal. Where an integrated receiver module or system on a chip is used, various components may be omitted, integrated with other components, or components with similar functionality may be employed for, such as, the MUX 708 or IF cable 710.

The dual receiver 700 also includes an Omni antenna 712, amplifier 714, and control PHY detector 716 providing a parallel detection mechanism. The Omni antenna 712 may be an antenna of the antenna arrays 702 or a separate antenna. The control PHY detector 716, as discussed in conjunction with detector 402 of FIG. 4, may be activated in parallel with the antenna arrays 702, and is configured to detect a control PHY signal via the Omni antenna 712. For example, PHY detector 716 may include suitable digital signal processing circuitry to detect the control PHY preamble. The control PHY signal may differ from a data PHY signal in multiple ways. For example, a control PHY signal may be received via an Omni directional antenna absent beamforming, and the control PHY preamble is significantly longer than a data PHY preamble.

When a data PHY preamble is obtained, the receiver decodes the data PHY preamble and may signal the control PHY detector 716 to temporarily stop attempting to decode and/or detect the data PHY preamble. After detecting a control PHY preamble being transmitted, the control PHY detector 716 generates a signal to the receiver and switches switch 718 from an input path from the antenna arrays 702, to an input path from the Omni antenna 712. The receiver may also switch from a mode for decoding the data PHY to a mode for decoding the control PHY. The receiver may then decode at least a remaining portion of the control PHY. The control PHY detector 716 may also signal the MUX 708 indicating a switch from data PHY to control PHY and the MUX 708 may act accordingly. The control PHY detector 716 or receiver may switch 718 back to the antenna arrays 702 after reception of the control PHY is completed. For example, in some cases the processing system can switch the input path of the receive processing chain back to the antenna array and process one or more frames of the second type after processing the frame of the first type.

While control PHY detector 716 may detect the transmission of the control PHY preamble while the control PHY preamble is still being transmitted, a portion of the control PHY preamble for triggering the control PHY detector 716 will not be passed along to the receiver by switching the receiver input from the antenna arrays 702 to the Omni antenna 712. According to certain aspects of the present disclosure, in order to compensate for this lost portion of the control PHY preamble, the receiver may be configured to work in conjunction with the control PHY detector 716 to obtain the portion of the control PHY preamble for triggering the control PHY detector 716.

Those skilled in the art will appreciate that aspects of the present disclosure may be readily expanded to cover various embodiments (e.g., other than the examples shown in the figures). For example, in some cases an addition data PHY (DPHY) preamble detector may be added between the down converter 706 and MUX 708 shown in FIG. 7. In this case, control PHY detector 716 and the additional data PHY detector may operate in parallel. Since multiple RF modules may be connected to a single frame receiver, a device can operate in parallel, resulting in diversity reception capability.

Further, the antenna 712 may not need to be in an Omni (or quasi-Omni) mode. For example, each of the antenna arrays 404 shown in FIG. 4 may be configured as "Omni" elements, where each array covers a part of the angular coverage where they all (collectively) provide a full (Omni) coverage. If each antenna array 404A has their own control PHY detection block 716 (and/or data PHY detection block), then Omni PHY detection may be achieved by using sectorial antenna arrays 404 In other words, antenna 712 may be a sectorial antenna (or antenna array) covering only part of the full angular span.

According to aspects of the present disclosure, a receiver may be able to receive a beamformed data PHY signal while monitoring for a non-beamformed control PHY. Enabling the station to monitor for non-beamformed control PHY signals, the station is able to reduce the use of RTC/CTS exchanges for data transmissions. For example, where a station is associated with an AP having a previously trained directional link, the station can immediately receive a directional signal from the AP without a RTS/CTS exchange. In parallel the station is able to monitor, receive, and appropriately address incoming RTS transmission on the control PHY by rapidly switching to receiving the control PHY once a control PHY preamble is detected.

According to aspects of the present disclosure, a wireless node may receive, from another wireless node the wireless node has previously established a trained directional link with, an indication to use the directional link without a RTS/CTS exchange. Based on this indication the wireless node may transmit to the another wireless node without a RTS/CTS exchange. Additionally or alternatively, the wireless node may configure its combiner and antenna arrays to be active and listening for directional transmissions from the another wireless node.

Figure 5A:
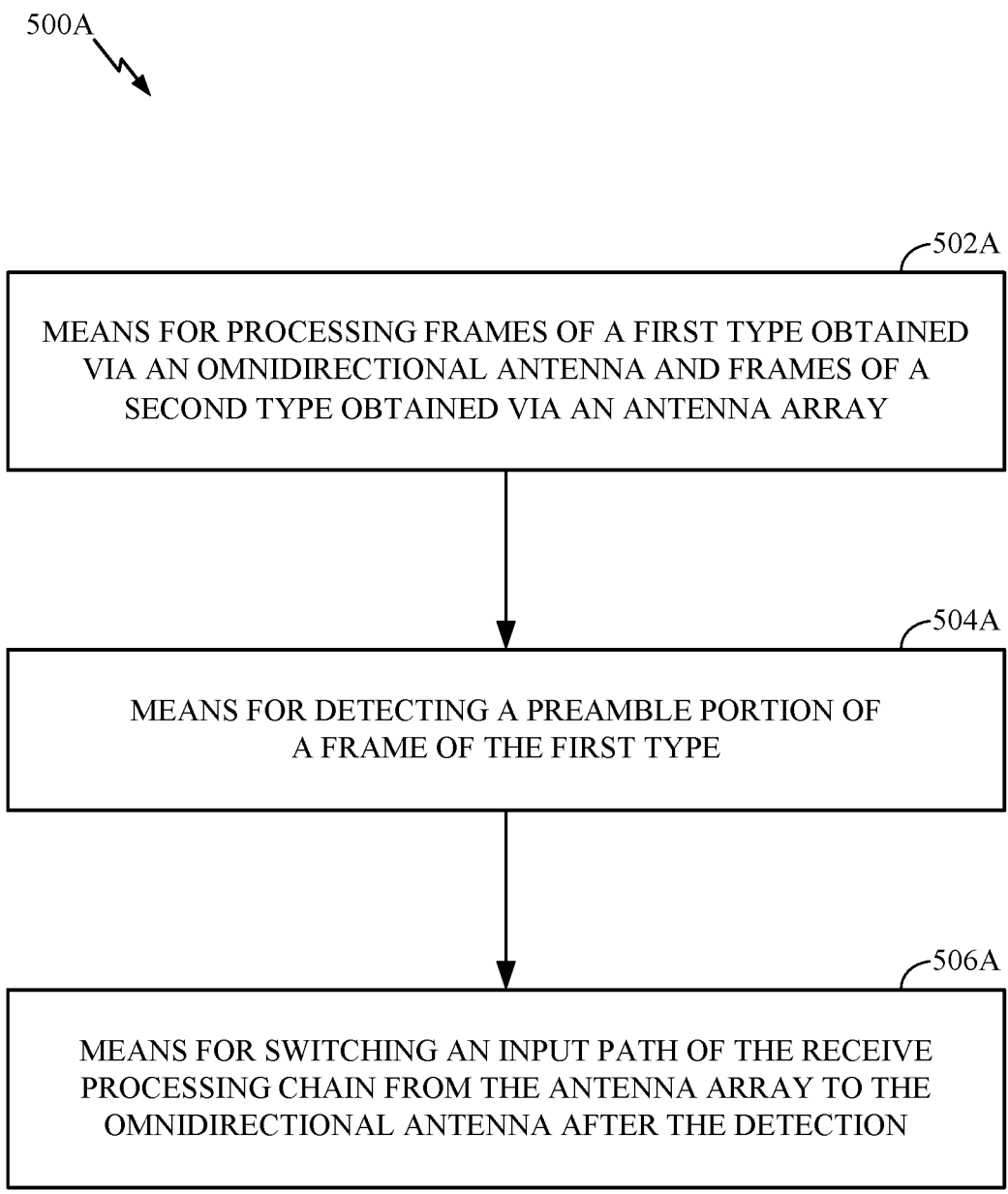
Figure 6A:
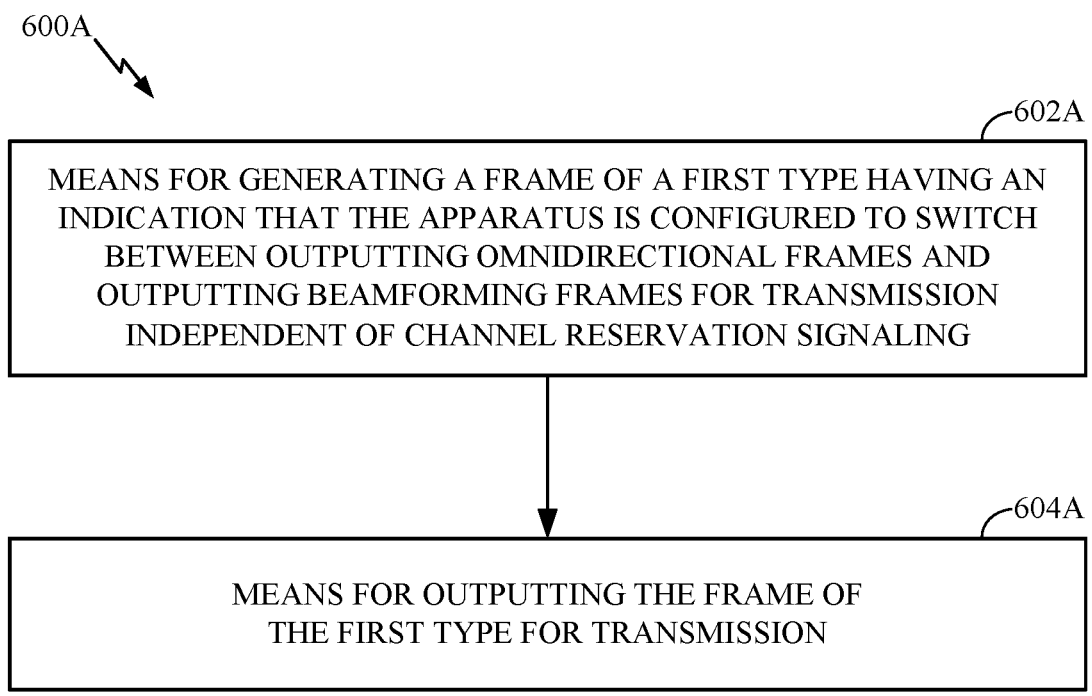

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500 illustrated in FIG. 5 correspond to means 500A illustrated in FIG. 5A and operations 600 illustrated in FIG. 6 correspond to means 600A illustrated in FIG. 6A.

Means for obtaining (e.g., receiving), means for detecting, means for decoding, means for signaling, means for distinguishing, means for generating a signal in response to detecting, and means for processing may comprise a receiver (e.g., the receiver unit 254) and/or an antenna(s) 252 of the UT 120 illustrated in FIG. 2 or the receiver 312 and/or antenna(s) 316 depicted in FIG. 3 or detectors 402A, 402B, 402C, and 402D portrayed in FIG. 4 and/or detector 716 portrayed in FIG. 7. Means for transmitting and means for outputting may be a transmitter (e.g., the transmitter unit of transceiver 254) and/or an antenna(s) 252 of the STA 120 illustrated in FIG. 2 or the transmitter (e.g., the transmitter unit of transceiver 222) and/or antenna(s) 224 of access point 110 illustrated in FIG. 2. Means for generating an IF signal may comprise a downconverter 706 of the dual receiver 700 as portrayed in FIG. 6 and/or the processing chain of the device 400 as portrayed in FIG. 4 and described in conjunction with FIG. 6.

Means for generating, means for detecting, means for determining, means for obtaining, means for selecting, means for adjusting, means for processing, means for encoding, means for switching, means for estimating, means for processing, and/or means for applying may include a processing system, which may include one or more processors such as processors 260, 270, 288, and 290 and/or the controller 280 of the UT 120 or the processor 304 and/or the DSP 320 portrayed in FIG. 3, and/or the processing chain of the device 400 as portrayed in FIG. 4 and described in conjunction with FIG. 6, and/or switch 718 of the dual receiver 700 as portrayed in FIG. 6.

In some cases, rather than actually transmitting a frame a device may have an interface to output a frame for transmission. For example, a processor may output a frame, via a bus interface, to a radio frequency (RF) front end for transmission. Similarly, rather than actually receiving a frame, a device may have an interface to obtain a frame received from another device. For example, a processor may obtain (or receive) a frame, via a bus interface, from an RF front end for reception.

According to certain aspects, such means may be implemented by processing systems configured to perform the corresponding functions by implementing various algorithms (e.g., in hardware or by executing software instructions) described above for determining rotation.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a STA 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a STA and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a STA and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
    an interface configured to obtain, in parallel:
        a preamble of one or more frames of a first type via an omnidirectional antenna; and
        one or more frames of a second type via a beamforming antenna array; and
    a processing system configured to switch an input path of a receive processing chain of the apparatus from the beamforming antenna array to the omnidirectional antenna to obtain the one or more frames of the first type in response to a detection of the preamble of the one or more frames of the first type being a different length than a preamble of the one or more frames of the second type, wherein the one or more frames of a first type are non-beamformed control physical layer (PHY) frames and the one or more frames of a second type are beamformed data PHY frames.

2. The apparatus of claim 1, wherein:
    the one or more frames of the first type comprise a control frame having a preamble longer than the preamble of the one or more frames of the second type.

3. The apparatus of claim 1, wherein:
    the processing system is further configured to decode the preamble of the one or more frames of the first type and to process another of the one or more frames of the first type, based on information in the preamble.

4. The apparatus of claim 1, wherein:
    the processing system is further configured to signal at least one detector that performed the detection to temporarily stop attempting to detect the preamble of the one or more frames of the first type, after obtaining one of the one or more frames of the second type.

5. The apparatus of claim 1, wherein:
    the processing system is further configured to switch the input path of the receive processing chain back to the beamforming antenna array and to process the one or more frames of the second type after processing the one or more frames of the first type.

6. The apparatus of claim 1, wherein:
    the interface is further configured to obtain an indication that a transmitting entity is to switch between transmitting omnidirectional frames and beamforming frames, and the switch occurs after obtaining the indication.

7. An apparatus for wireless communication, comprising:
    a processing system configured to:
        generate a control frame of a first type, having a preamble with a length different than a preamble of one or more data frames of a second type, that includes an indication that the apparatus is configured to switch between outputting omnidirectional frames and outputting beamforming frames for transmission independent of channel reservation signaling, wherein the omnidirectional frames comprise control frames and the beamforming frames comprise data frames; and
    a first interface configured to output the control frame of the first type for transmission.

8. The apparatus of claim 7, wherein:
    the processing system is configured to generate a frame of a second type having an indication that the apparatus is configured to use channel reservation signaling to switch between outputting the omnidirectional frames and outputting the beamforming frames for transmission; and
    the first interface is configured to output the frame of the second type for transmission.

9. A wireless station, comprising:
    a receive processing chain configured to obtain, in parallel:
        a preamble of one or more frames of a first type via an omnidirectional antenna; and
        one or more frames of a second type via a beamforming antenna array;
    at least one detector configured to detect the preamble of the one or more frames of the first type; and
    a processing system configured to switch an input path of the receive processing chain from the beamforming antenna array to the omnidirectional antenna based, at least in part, on the detection, wherein
        the at least one detector is configured to:
            detect the preamble of the one or more frames of the first type by distinguishing the preamble of the one or more frames of the first type from a preamble of the one or more frames of the second type; and
            generate a signal, in response to the detection, to cause the processing system to switch the input path of the receive processing chain from the beamforming antenna array to the omnidirectional antenna;
        the receive processing chain is configured to obtain a radio frequency (RF) signal via either the beamforming antenna array or the omnidirectional antenna; and
        the receive processing chain further comprises a downconverter that generates an intermediate frequency (IF) signal from the RF signal.

10. The apparatus of claim 7, wherein:
    the apparatus comprises a wireless station; and
    the first interface comprises a transmitter configured to transmit the control frame of the first type.

* * * * *